United States Patent Office 3,293,553
Patented Dec. 20, 1966

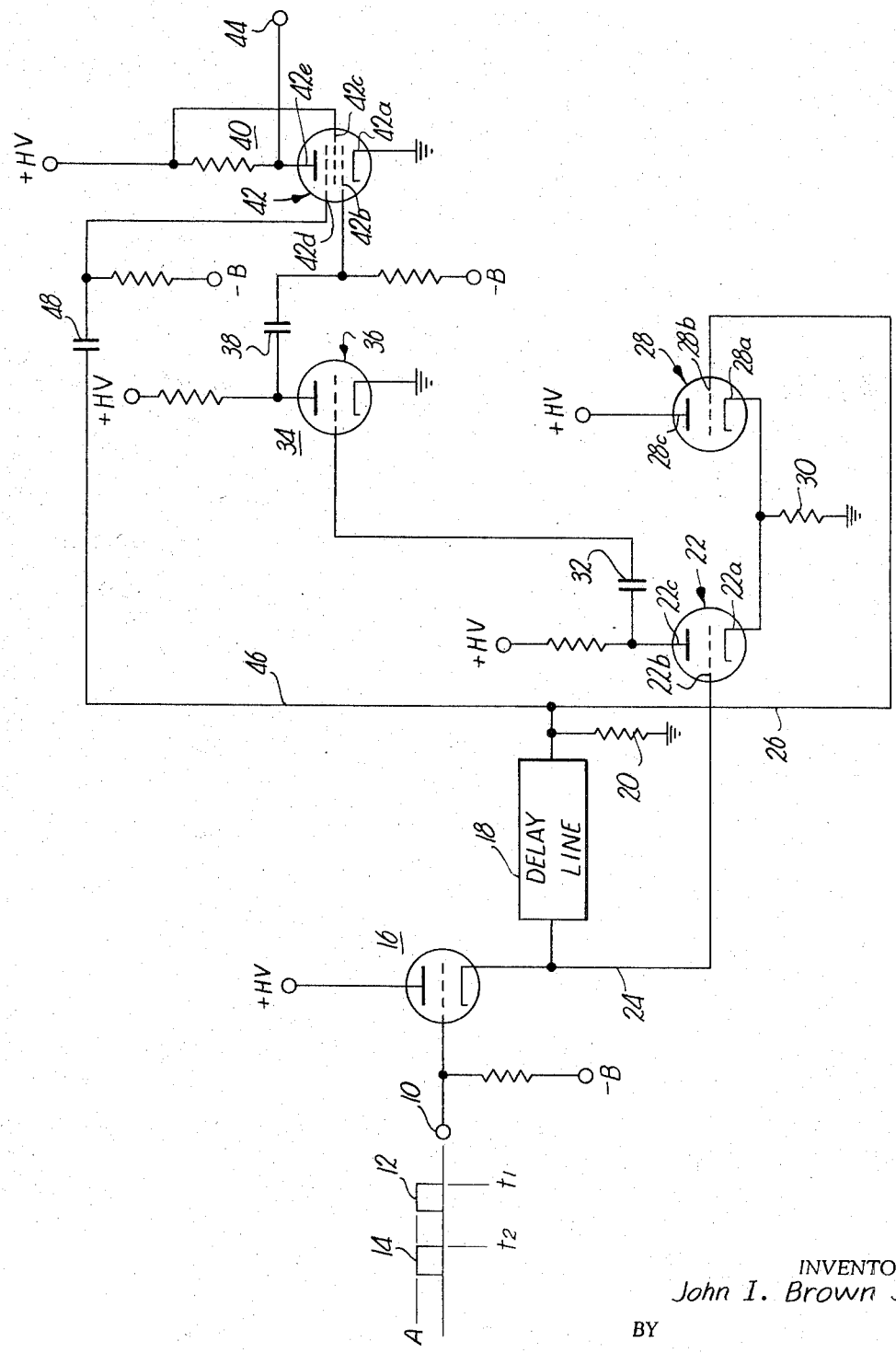

3,293,553
PULSE TIME AND AMPLITUDE COMPARING
CIRCUITRY
John I. Brown, Jr., Raytown, Mo., assignor to Wilcox
Electric Company, Inc., Kansas City, Mo., a corporation of Kansas
Filed July 2, 1962, Ser. No. 206,949
6 Claims. (Cl. 328—115)

This invention relates to pulse time and amplitude comparing circuitry and, more specifically, to circuitry for producing a command signal to trigger a transponder transmitter.

In general, a transponder is a combination receiving and transmitting device that transmits useful information upon receiving signals of a predetermined configuration. Transponder systems are commonly utilized in aircraft and often in association with a primary ground radar system. In such applications the transponder is an airborne device that responds upon being interrogated by a ground based transmitter.

The ground station containing the interrogating transmitters and antennas transmits a series of pulses of a predetermined time spacing and amplitude relationship through a multiplicity of antennas, often an omnidirectional antenna and an associated rotating directional antenna. In a system using a pair of pulses for purposes of interrogation, the first pulse may be radiated from the omnidirectional antenna and the second pulse of the pulse pair transmitted from the rotating directional antenna. The directional antenna may then be rotated over an arc corresponding to the particular directions that interrogation is desired. Therefore, any aircraft present in the area subtended by the interrogating directions will respond in accordance with the requested information.

It may therefore be seen from the foregoing brief discussion of transponder systems that a time spacing and amplitude comparison of the transmitted pulses must be made by the receiver unit of the airborne transponder. Without such a comparison, all aircraft having the appropriate transponder equipment would respond to the ground signals as long as they were within the range of the omnidirectional antenna and could also receive signals from one of the lobes of the directional antenna. This, of course, is undesirable as interrogation only along the main lobe of the directional antenna is desired.

Furthermore, reflected signals originating from either ground antenna could possibly produce a pulse pair combination that would trigger the transponder transmitter. To reduce this possibility to a minimum a time spacing comparison must be effected between the two pulses of the pulse pair. Both time and amplitude comparing circuitry, therefore, is required to insure proper directional response characteristics of the transponder system.

It is therefore an object of this invention to provide circuitry for comparing the time spacing and amplitude of pulse signals.

It is another object of this invention to provide circuitry that may be utilized in transponder systems to insure that the transponder transmitter will be triggered by pulse groups having only the desired time spacing and amplitude characteristics.

It is still another object of this invention to provide circuitry that may be utilized in an airborne transponder to compare the amplitude of a first signal pulse with the amplitude of a second subsequent signal pulse and the time spacing therebetween so that a transmitter in the aircraft may be triggered thereby and provide the response requested by the interrogating pulse pair.

Other objects will become apparent as the detailed description proceeds.

In the drawing:

The figure is a schematic diagram of the circuitry of the present invention.

Referring to the figure, it may be seen that an input terminal 10 is provided for receiving input signal pulses such as pulses 12 and 14. Pulses 12 and 14 are graphically illustrated as pulses of amplitude A arriving at input terminal 10 at time $t_1$ and $t_2$ respectively. A cathode follower stage 16 is utilized to couple the pulse signals to a delay line 18 having a low characteristic impedance. It should be understood in the figure that a common ground serves as a second input (and output) terminal, thus providing the apparatus with a two terminal input and output. Furthermore, power sources for the high voltage plate supplies and the grid bias supplies are not shown as such but are represented in the figure by the +HV and −B leads, respectively, of the corresponding vacuum tubes. The heater filaments of the vacuum tubes and their power source are also not shown.

The delay line 18 may be a variety of conventional electronic devices. For example, delay line 18 may be a low pass filter having linear phase shift characteristics over its pass band. The function of the delay line, therefore, is to deliver an output signal substantially unchanged in form and amplitude but delayed in time. In the instant illustration where the time spacing between equivalent points on pulses 12 and 14 equals $t_2$ minus $t_1$, the parameters of delay line 18 which control its phase linear characteristics would be selected to give a phase shift equivalent to the $t_2$ minus $t_1$ spacing. Delay line 18 is terminated by resistance 20, said resistance being of a value equal to the characteristic impedance of the delay line.

Vacuum tube 22 having a cathode 22a, a grid 22b and a plate 22c is provided for mixing the pulses from delay line 18 with the input pulses. More specifically, it may be noted that lead 24 from the output of the cathode follower stage 16 by-passes the circuitry of delay line 18 and is connected to grid 22b. The delayed pulses appearing across resistance 20, however, are coupled to the cathode 22a by means of lead 26, vacuum tube 28 and cathode resistance 30. Vacuum tube 28 comprises a cathode 28a, a grid 28b and a plate 28c, and is utilized to provide the proper bias for the grid 22b of tube 22. Furthermore, tube 28 serves to hold the termination of delay line 18 undisturbed by placing a high impedance in parallel with resistance 20. Tube 28 should be selected to substantially match the characteristics of tube 22.

As there is no negative bias voltage on grid 22b of vacuum tube 22, the tube conducts at all times. The superimposing of the input pulses and the delayed pulses on this steady conduction by the grid and cathode circuitry above described, therefore, serves to alter the otherwise steady output of tube 22. It is evident that the delayed pulses arriving at cathode 22a will serve to drive said cathode more positive. Also, input pulses arriving from lead 24 will serve to drive grid 22b more positive. Therefore, if the arrival of the pulse at cathode 22a is not accompanied by a pulse arrival at grid 22b, the output of tube 22 from plate 22c will be substantially reduced or cut off. However, a pulse of proper amplitude arriving at grid 22b may be sufficient to offset the effect of the delayed pulse on cathode 22a and thus result in an increase in the output signal level of tube 22.

The output of vacuum tube 22 is coupled by capacitor 32 to a high gain amplifier stage 34. Amplifier stage 34 comprises a triode vacuum tube 36 operated in common cathode configuration. Since the output of tube 22 is shifted 180° in phase, it is necessary that the tube 36 of amplifier stage 34 also serve as a 180° phase shifter to return the pulses to their original polarity.

The output of stage 34 is coupled by capacitor 38 to a command signal producing stage 40. Stage 40 comprises a pentode vacuum tube 42 having a cathode 42a, a first control grid 42b, a screen grid 42c, a second control grid 42d and a plate 42e. Stage 40 is the output stage of the present invention, said output appearing at output terminal 44. Tube 42 is operated normally cut off by both control grids 42b and 42d such that no output appears at terminal 44. Cut-off is effected by the grid bias voltages represented by the —B leads connected to grids 42b and 42d.

The operation of the present invention is best further described by means of an illustration. For purposes of such illustration it will be assumed that the invention is being utilized as the circuitry interconnecting the receiver and transmitter of an airborne transponder. The ultimate function of the circuitry is to produce a command signal at the output terminal 44 to trigger the transponder transmitter. It is assumed that in the particular transponder system, the amplitude of the second input signal pulse of the pulse pair must be equal to or greater than the amplitude of the first input pulse signal before triggering of the transmitter is desired. Such first pulse corresponds to pulse 12 and would generally be the pulse radiated by the omnidirectional ground antenna. The second pulse corresponds to pulse 14 radiated by the directional ground antenna as previously discussed for purposes of directional interrogation. Furthermore, it is assumed that the desired pulse spacing for transponder transmitter response corresponds to the spacing illustrated in the figure and that the parameters of delay line 18 are such that pulse 12 of the pulse pair will be delayed in time by the action of delay line 18 so that the arrival of the input pulses and the delayed pulses at cathode 22a and grid 22b of tube 22 will coincide.

Under the conditions aforesaid an increase in the output signal level of vacuum tube 22 is produced by the coincident arrival of the pulses at cathode 22a and grid 22b. This increase must reach a signal level sufficient to drive amplifier stage 34 to an output level sufficient to overcome the cut-off bias on control grid 42b of tube 42. Since both pulses 12 and 14 of the pulse pair are equal in amplitude in this illustration, the bias on grid 42b would be adjusted so that this amplitude relationship produces the minimum drive level necessary to overcome the cut-off bias on grid 42b.

Having thus overcome the cut-off bias on grid 42b, it is evident that a similar occurrence at grid 42d is requisite before an output will be obtained from stage 40. Since pulse 12 appears on grid 22b by the shunting action of lead 24 around the delay line 18, it is necessary that the invention be allowed to "wait" for the arrival of pulse 14. If there were no provision in the circuitry for holding the logic function of the invention until the expected arrival of pulse 14, then stage 40 would produce an output immediately upon the arrival of pulse 12 because grid 22b of tube 22 is driven more positive by pulse 12, thereby increasing the output signal level of tube 22 to, in turn, overcome the bias on grid 42b. Without the positive pulse on cathode 22a, the effect of the initial pulse is such that gride 42b would be biased well into the conduction range. Therefore, it is requisite that the output of delay line 18 be coupled as by lead 46 and capacitor 48 to the bias circuitry of the second control grid 42d. The cut-off bias voltage on grid 42d is adjusted such that an input pulse of a predetermined minimum amplitude is necessary to drive grid 42d above the cut-off point. This minimum predetermined amplitude, therefore, could be utilized to set the approximate field strength of the surface transmitter that the airborne transponder would respond to. This, of course, allows the ground station to control the maximum effective range of its interrogating signals.

It will therefore be appreciated that the spacing between pulses 12 and 14 of the pulse pair must correspond to a predetermined time spacing in order for an output to appear at output terminal 44. In other words, both grids 42b and 42d of tube 42 in stage 40 must be simultaneously driven into conduction. The time spacing between the pulses necessary for transponder response is easily varied by adjusting the parameters of delay line 18 to obtain the proper phase shift. In this manner, or by providing a plurality of circuits of the present invention having different delay characteristics, multi-channel interrogation is facilitated.

The ratio of the amplitudes of pulses 12 and 14 of the pulse pair need not be unity in order for the invention to function properly. Although in practice the unity ratio is commonly utilized, the passive parameters in the circuitry of the invention may be selected such that said ratio may be varied from approximately 0.7 to 1.3. Furthermore, the amplitude of the pulses can vary over a range of approximately 40 to 1 in voltage, an important capability in airborne transponder operation where distances from the ground transmitter may vary widely and rapidly.

It should be understood that the time constant of the circuit of the present invention must be such that the effect of each pulse pair upon the circuit logic is terminated prior to the arrival of the next pulse pair. Such manipulation is, of course, within the capabilities of one skilled in the art. Also, the time constants of capacitors 32, 38 and 48 must be long with respect to pulse width so that the only substantial effect of the capacitors is to block the transfer of the direct current supply voltage.

Although vacuum tube 42 in stage 40 is shown in the figure as a pentode, a number of multi-grid vacuum tubes may be utilized in this stage. The only requirement for a suitable tube 42 is that said tube have at least two control grids capable of being biased to cut-off.

Having thus described the invention what is claimed as new and desired to be secured by Letters Patent is:

1. A pulse time and amplitude comparing circuit for producing a command signal when a predetermined time spacing and amplitude relationship exists between a first input signal pulse and a second, subsequent input signal pulse comprising:

means for delaying the input pulses a time equal to said time spacing;

an active electrical device operable to normally produce an output signal of a predetermined level, and having a pair of elements for controlling said level;

means intercoupling the output of the delay means and one of said elements for exciting the latter in response to delayed pulses delivered by said delay means;

means for receiving the input pulses and coupled with the other of said elements for exciting the latter in response to said input pulses, said intercoupling means and said receiving means being operable to drive the respective elements coupled thereto in a manner to produce opposite changes in said level, and to effect a change therein in a predetermined direction when both of said elements are simultaneously excited and when the delayed pulses and the input pulses have said amplitude relationship; and means coupled with the output of said delay means and the output of said device for producing said command signal, and including structure for permitting the production of said command signal only when the level of said output signal changes in said direction and arrival of one of the delayed pulses at said structure occurs during said change of the level in said direction.

2. The circuit as set forth in claim 1, wherein said command signal producing means includes vacuum tube means, said structure comprising control grid means.

3. The circuit as set forth in claim 1, wherein said device includes vacuum tube means and said elements are operable to superimpose the input pulses and the delayed pulses upon the output signal level thereof.

4. A pulse time and amplitude comparing circuit for producing a command signal when a predetermined time spacing and amplitude relationship exists between a first input signal pulse and a second, subsequent input signal pulse comprising:

means responsive to the input pulses for delaying said pulses a time equal to said predetermined time spacing;

first vacuum tube means operable to normally produce an output signal of a first predetermined level, and having a cathode, a grid, and a plate;

means intercoupling the output of the delay means and said cathode for driving the latter more electropositive in response to each of the delayed pulses from the delay means and in accordance with the magnitude thereof;

means for receiving said input pulses and coupled with said grid for driving the latter more electropositive in response to each of said input pulses and in accordance with the magnitude thereof, whereby to increase the level of said output signal to a second predetermined level when the delayed pulses and the input pulses have a selected amplitude ratio and when the delayed pulses arrive at said cathode and the input pulses arrive at said grid simultaneously; and second vacuum tube means for producing the command signal including control elements, operably coupled with said delay means and said plate, normally holding said second tube means in cutoff condition and operable to permit the production of said command signal in response to said output signal and the delayed pulses only when said output signal is of a level at least equal to said second predetermined level and one of the delayed pulses coincides in time with said output signal.

5. The circuit as set forth in claim 4, wherein the second vacuum tube means comprises a multi-grid vacuum tube and the control elements therefor comprise first and second grid means responsive, respectively, to the output signal of said first vacuum tube means and the delayed pulses.

6. The circuit as set forth in claim 4, wherein said pulse delay means comprises a phase linear delay line.

References Cited by the Examiner
UNITED STATES PATENTS

| | | | |
|---|---|---|---|
| 2,703,364 | 3/1955 | Birnbaum | 328—108 |
| 2,961,609 | 11/1960 | Manring | 328—110 X |

JOHN W. HUCKERT, *Primary Examiner.*

ARTHUR GAUSS, *Examiner.*

E. DREYFUS, L. ZALMAN, J. CRAIG,
*Assistant Examiners.*